(12) United States Patent  
Grimsley et al.

(10) Patent No.: US 8,601,164 B2  
(45) Date of Patent: Dec. 3, 2013

(54) HTTP HEADER COMPRESSION

(75) Inventors: Nicholas S. Grimsley, Olathe, KS (US); Kyle J. Hill, Olathe, KS (US); Robert L. Marshall, Stilwell, KS (US); Sean A. Pfeifer, Overland Park, KS (US)

(73) Assignee: Garmin Switzerland GmbH (CH)

( * ) Notice: Subject to any disclaimer, the term of this patent is extended or adjusted under 35 U.S.C. 154(b) by 448 days.

(21) Appl. No.: 12/629,737

(22) Filed: Dec. 2, 2009

(65) Prior Publication Data

US 2011/0131412 A1 Jun. 2, 2011

(51) Int. Cl.
*G06F 15/16* (2006.01)
*G06F 15/173* (2006.01)
*H04J 3/16* (2006.01)

(52) U.S. Cl.
USPC ........... 709/247; 709/203; 709/230; 709/238; 370/469

(58) Field of Classification Search
USPC ........... 708/203; 713/152, 160; 709/230, 236, 709/237
See application file for complete search history.

(56) References Cited

U.S. PATENT DOCUMENTS

| | | | |
|---|---|---|---|
| 6,345,307 B1 | 2/2002 | Booth | 709/247 |
| 7,020,719 B1* | 3/2006 | Grove et al. | 709/238 |
| 7,397,819 B2* | 7/2008 | Kobayashi | 370/469 |
| 7,912,089 B2* | 3/2011 | Walsh | 370/477 |
| 7,920,590 B2* | 4/2011 | Le et al. | 370/467 |
| 2005/0188054 A1 | 8/2005 | Riihijarvi et al. | 709/218 |
| 2005/0207418 A1* | 9/2005 | Tang et al. | 370/392 |
| 2005/0238008 A1* | 10/2005 | Fraser | 370/389 |
| 2007/0299988 A1 | 12/2007 | Weller | 709/247 |
| 2008/0155016 A1* | 6/2008 | Tsai | 709/203 |

OTHER PUBLICATIONS

Wikipedia, "OSI Model", accessed on May 2, 2012.*
HTTP Compression Speeds up the Web from http://www.webreference.com/internet/software/servers/http/compression/3.html; published prior to Dec. 2, 2009.
HTTP Compression from http://www.websiteoptimization.com/speed/tweak/compress/ published prior to Dec. 2, 2009.
HTTP Compression from http://en.wikipedia.org/wiki/Http_compression published prior to Dec. 2, 2009.
Web Site Compression from http://www.15seconds.com/Issue/020314.htm published prior to Dec. 2, 2009.
GZIP file format specification version 4.3 from http://www.ietf.org/rfc/rfc1952.txt published prior to Dec. 2, 2009.
DEFLATE Compressed Data Format Specification version 1.3 from http://www.ietf.org/rfc/rfc1951.txt published prior to Dec. 2, 2009.
International Search Report from corresponding International Application No. PCT/US2010/057965, dated Aug. 3, 2011.

* cited by examiner

*Primary Examiner* — Wen-Tai Lin
(74) *Attorney, Agent, or Firm* — Samuel M. Korte; Mohammad M. Ali

(57) ABSTRACT

Techniques for HTTP header compression are described herein. In an implementation, an electronic device may be configured to enable compression/decompression of HTTP messages, including compression/decompression of information in the headers of the messages. A HTTP message is generated that contains at least a header and a body. The HTTP message is reformatted to place at least some of the header information into the body. Then, the body of the reformatted message having the header information is compressed to form a compressed HTTP message. Decompression may be applied by a recipient of the compressed HTTP message to reconstruct the original HTTP message.

24 Claims, 6 Drawing Sheets

HTTP HEADER COMPRESSION

BACKGROUND

Portable electronic devices including navigation devices are becoming increasingly more popular. As the popularity of portable electronic devices has increased, manufacturers have responded by developing cross-functional devices to provide multiple functions. Thus, enhanced electronic devices may be configured to provide a wide range of functions and applications, only some of which are location-oriented. For instance, an electronic device may provide a combination of position-determining functionality, mobile phone service, Internet capability and so on. Further, an electronic device may be configured to utilize more than one position-determining technique to determine its geographic locations. When used for various activities, portable electronic devices may use hypertext transfer protocol (HTTP) to send and receive messages.

Due to the limited resources (bandwidth, processing power, battery life, etc) of some electronic devices, compression that reduces the size of the messages may be employed by the devices to manage and preserve the resources. Traditional compression techniques involve applying compression to the body of a message while leaving the header of the message intact. For messages containing a substantial amount of information in the header, though, traditional techniques that compress the body alone may not achieve a sufficient reduction in the size of the messages.

SUMMARY

Techniques for HTTP header compression are described herein. In an implementation, an electronic device may be configured to enable compression/decompression of HTTP messages, including compression/decompression of information in the headers of the messages. A HTTP message is generated that contains at least a header and a body. The HTTP message is reformatted to place at least some of the header information into the body. Then, the body of the reformatted message having the header information is compressed to form a compressed HTTP message. Decompression may be applied by a recipient of the compressed HTTP message to reconstruct the original HTTP message.

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
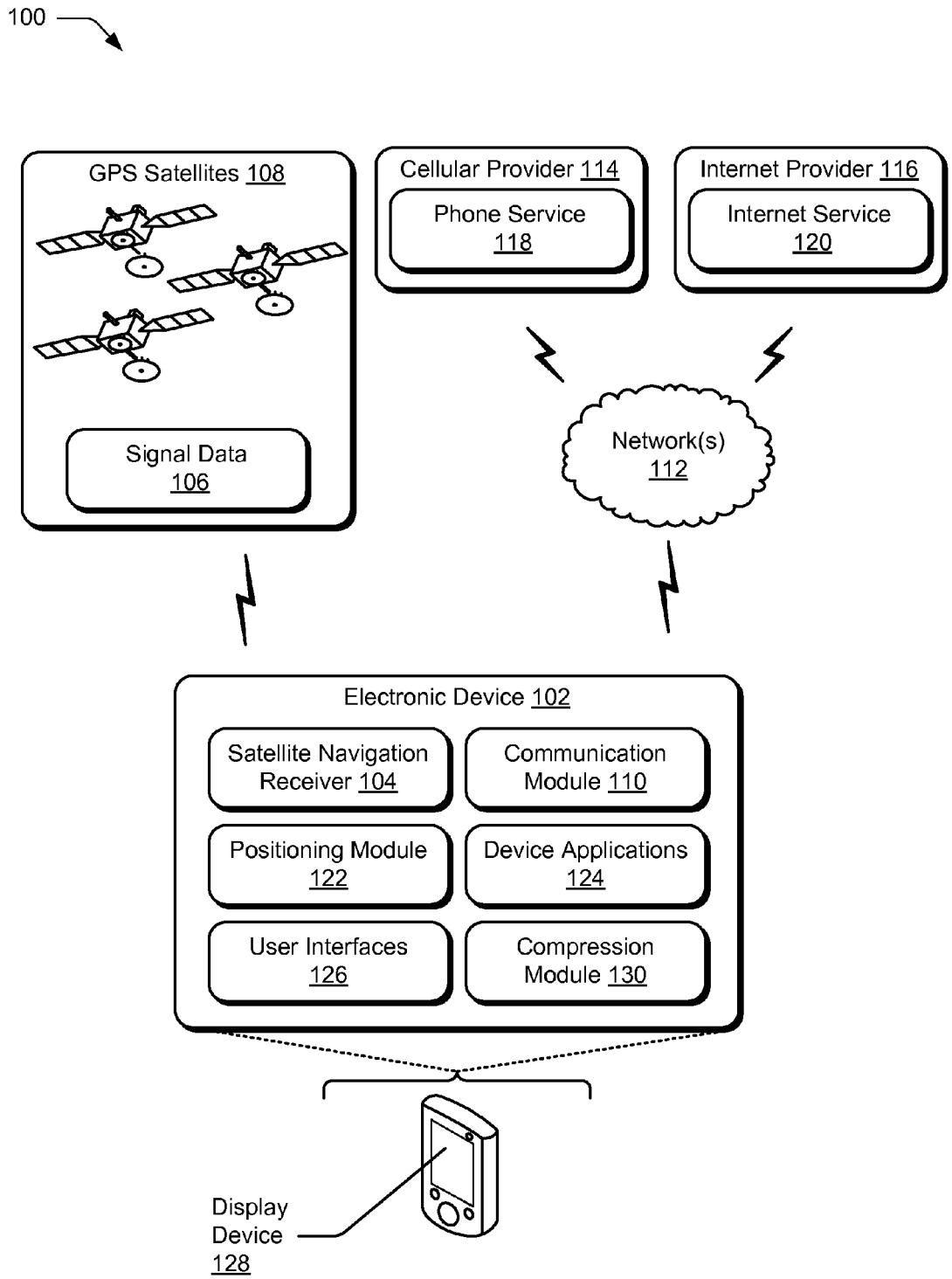
FIG. 1 depicts an example environment in which HTTP header compression techniques may be employed.

As the popularity of portable electronic devices has increased, manufacturers have responded by developing cross-functional devices that provide multiple functions. Thus, a portable electronic device may be configured to provide a wide range of functions for a wide range of applications, such as a navigation device providing a combination of position-determining functionality, mobile phone service, internet capability, and so forth. Some electronic devices may have relatively limited resources (bandwidth, processing power, battery life, etc). Moreover, time and costs associated with downloading information by electronic devices over a network may increase proportionally with the amount of information (e.g. number of bytes). Accordingly, compression that reduces the size of messages (e.g. hypertext transfer protocol (HTTP) requests/replies) may be employed with the devices to manage and preserve the resources. Some traditional compression techniques operate by compressing the body of a message without applying compression to the header. These traditional techniques, though, may fail to achieve optimum compression especially when used to compress messages containing substantial information in the header.

Techniques for HTTP header compression are described herein. An electronic device may be configured to enable compression and decompression of HTTP messages. For example, a client device may generate a HTTP message that contains at least a header and a body to request resources (e.g., webpages) from a server device. A compression module of the client device may operate to reformat the HTTP message to place at least some of the header information into the body. For instance, selected header fields and/or key value pairs may be moved to the body of the message. In at least some embodiments, an identifier is placed in the header to identify and/or replace the moved information. The identifier is detectable by a recipient (e.g., the server device) to determine that compression has been applied to the message and/or to determine that at least some header information has been placed into the body. Different identifiers may be selectively employed by the compression module to designate corresponding protocols, schemes, compression algorithms, customized replacements, and formats for HTTP messages. The compression module may also operate to apply various compression techniques to the reformatted message to reduce the size of the message and thereby form a compressed HTTP message. The compression is applied to the body and the header information that is copied into the body. The client device may then communicate the compressed HTTP message to the server device.

The server device may receive the compressed HTTP message from the client device. A compression module deployed to the server device may operate to detect the identifier placed in the header and process the HTTP message accordingly. In particular, the compression module at the server device can apply decompression that is designated by or otherwise identifiable based on the identifier. The compression module may also reconstruct the header based on the identifier to include the header information that was placed into the body. The server device may then process the decompressed and reconstructed HTTP message to provide requested resources to the client device. In at least some embodiments, the compression module at the server device is configured to form responses to the client device in accordance with techniques specified by selective inclusion of different identifiers in the header.

In the discussion that follows, a section entitled "Example Environment" describes an example environment, components, and devices that can be utilized with one or more embodiments of HTTP header compression. Following this, a section entitled "Example Procedures" describes example techniques for HTTP header compression that may be implemented by way of the example environment, components, and/or devices in accordance with one or more embodiments. After that, a section entitled "Compression Implementation Examples" describes various examples of HTTP messages in accordance with techniques for HTTP header compression. Last, a section entitled "Example Devices" is provided and describes example devices that can be used to implement one or more embodiments.

Example Environment

FIG. 1 illustrates an implementation of an environment 100 in which techniques for HTTP header compression may be employed. In the depicted example, the environment 100 includes an electronic device 102. Electronic device 102 may be configured to provide a variety of functionality through various applications, components, modules, and operational modes of the electronic device 102. A variety of electronic devices 102 suitable to provide the variety of functionality are contemplated. For instance, an electronic device 102 may be configured as devices including but not limited to a mobile phone, a navigation device, a portable computer, a personal digital assistant, a multimedia device, an exercise and fitness device, a game device, and/or combinations thereof. In the following description a referenced component, such as electronic device 102, may refer to one or more entities, and therefore by convention reference may be made to a single entity (e.g., the electronic device 102) or multiple entities (e.g., the electronic devices 102, the plurality of electronic devices 102, and so on) using the same reference number.

In an implementation, electronic device 102 includes functionality to determine position. For example, electronic device 102 is depicted as including a satellite navigation receiver 104 that represents functionality to receive signal data 106 from navigation satellites 108. Satellite navigation receiver 104 may be configured in a variety of ways such as a global positioning system (GPS) receiver, a GLONASS receiver, a Galileo receiver, or other satellite navigation receiver.

Electronic device 102 also includes a communication module 110 representative of communication functionality to permit electronic device 102 to send/receive data between different devices (e.g., components/peripherals) and/or over the one or more networks 112. Communication module 110 is representative of a variety of communication components and functionality including but not limited to one or more antennas, a browser, a transmitter, a receiver; a wireless radio, data ports; software interfaces and drivers, networking interfaces, data processing components, and so forth.

The one or more networks 112 are representative of a variety of different communication pathways and network connections which may be employed, individually or in combination, to communicate among the components of the environment 100. Thus, the one or more networks 112 may be representative of communication pathways achieved using a single network or multiple networks. Further, the one or more networks 112 are representative of a variety of different types of networks and connections including but not limited to: the Internet; an intranet; a satellite network; a cellular network; a mobile data network; wired and/or wireless connections; and so forth. Examples of wireless networks include but are not limited to networks configured for communications according to: one or more standards of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through universal serial bus (USB), Ethernet, serial connections, and so forth.

For example, electronic device 102 (through functionality represented by the communication module 110) may be configured to communicate via one or more networks 112 with a cellular provider 114 and/or an internet provider 116 to receive phone service 118 and Internet service 120 respectively. Internet service 120 may represent a variety of different types of content/services, examples of which include but are not limited to web pages, location services, web services, music, video, email service, instant messaging and so forth. While illustrated separately, internet service 120 and phone service 118 may be provided through a common provider. For example, cellular provider 114 may provide both phone service 118 and internet service 120.

As noted, electronic device 102 may be configured to determine position. More particularly, electronic device 102 may include a positioning module 122 that is configured to manage, use, and selectively switch between a variety of positions sources and/or position-determining techniques to determine a geographic position of the electronic device 102. For instance, positioning module 122 may manage and process signal data 106 received from the GPS satellites 108 via the Satellite navigation receiver 104. The electronic device 102 may receive signal data 106 transmitted by one or more position data platforms and/or position data transmitters, examples of which are depicted as the GPS satellites 108. The positioning module 122 is representative of functionality operable to determine a geographic position through processing of the received signal data 106. The signal data 106 may include various data suitable for use in position determination, such as timing signals, ranging signals, ephemerides, almanacs, and so forth. Thus, positioning module 122 may manage and process signal data 106 from GPS satellites 108 to provide a variety of position-determining functionality.

In addition to determining position through the GPS system as described, it should be apparent that a wide variety of other positioning systems may also be employed, such as terrestrial based systems (e.g., wireless-phone based systems such as A-GPS that determine position data from cellular towers, such as through phone service 118), wireless networks that transmit positioning signals, and so on. For example, positioning-determining functionality may be implemented through use of a server in a server-based architecture, from a ground-based infrastructure, through one or more sensors (e.g., gyros, odometers, and magnetometers), use of "dead reckoning" techniques, and so on. The positioning module 122 may also be configured to selectively switch between a variety of position-determining techniques that may be available through different position sources. Thus, in addition to using the GPS satellites 108, the positioning module 122 of the example electronic device 102 in FIG. 1 may also determine position through the cellular service 118 and/or Internet service 120.

The electronic device 102 may also include a variety of device applications 124 which may be configured to provide a wide range of functionality to the electronic device 102. The positioning module 122 may be operable to provide a determined position and/or other position data to the various device applications 124 to enable position dependent functionality. Position dependent functionality may include but is not limited to indicating geographic position on a map, tracking speed and distance, weather service, traffic service, providing navigation instructions, providing trip data, conducting position based point of interest (POI) searches, database searches, and/or internet searches, and so forth. Device applications 124 may be executable by the device to cause output of corresponding user interfaces 126 configured to enable interaction with position dependent functionality and/or other functionality provided by the various device applications 124. The various user interfaces 126 may be presented to a user, such as being displayed on the display device 128 of example electronic device 102 of FIG. 1.

The electronic device 102 may also include a compression module 130 that represents functionality configured to implement various HTTP header compression techniques described herein. In general, the compression module 130 may be operable to reformat and compress messages in various ways to form compressed messages for communication by the electronic device 102 to recipients. Compression module 130 may also be operable to decompress and reconstruct messages obtained from other devices to form messages for use by the electronic device 102. Further discussion of functionality, modules, and techniques to implement embodiments of HTTP header compression may be found in relation to the following figures.

Figure 2:
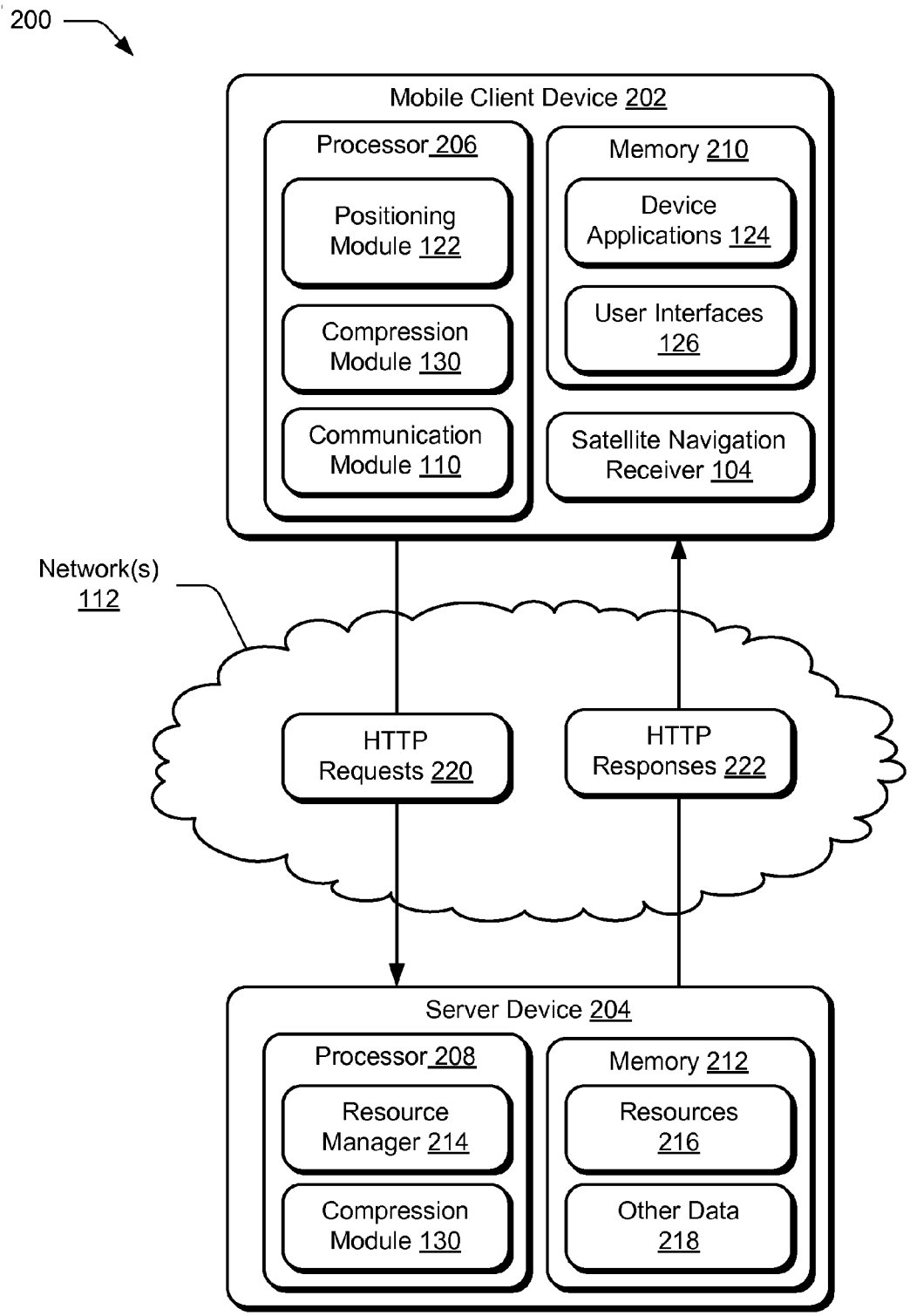
FIG. 2 depicts example implementations of a mobile client device and a server device configured to perform HTTP header compression techniques.

FIG. 2 depicts an implementation 200 of an example of electronic device 102 of FIG. 1 in greater detail. In particular, an example electronic device 102 of FIG. 1 is illustrated as a mobile client device 202 that is configured to communicate via the networks 112 with a server device 204. The mobile client device 202 may include at least functionality to determine position. In addition, mobile client device 202 may be configured as a variety of devices including but not limited to a mobile phone, a portable computer, a personal digital assistant, a multimedia device, a game device, a portable navigation device, and/or combinations thereof. The example mobile client device 202 and server device 204 of FIG. 2 are illustrated as including respective processors 206, 208 and memory 210, 212 that may be utilized to provide a variety of processing and storage capabilities.

Processors 206, 208 are not limited by the materials from which it is formed or the processing mechanisms employed therein, and as such, may be implemented via semiconductor(s) and/or transistors, microprocessors, microcontrollers, programmable intelligent computers (PICs), or the like. A processor may also include field-programmable gate arrays (FPGAs), or other programmable logic devices (PLDs), fully-custom or semi-custom application-specific integrated circuits (ASICs), or any other device that is described by one or more code segments of a hardware description language (HDL). Further, a processor may include combinations of any of the components listed. Additionally, although a single memory is shown for the example devices, a wide variety of types and combinations of memory may be employed, such as random access memory (RAM), hard disk memory, removable medium memory (e.g., the memory 210, 212 may be implemented via a slot that accepts a removable memory cartridge), and other types of computer-readable media.

In the example mobile client device 202 of FIG. 2, the compression module 130, positioning module 122, and communication module 110 are illustrated as modules that are executed via processor 206 and are also storable in the memory 210. It is noted generally that any of the functions described herein can be implemented using software, firmware, hardware (e.g., fixed logic circuitry), manual processing, or a combination of these implementations. The terms "module" and "functionality" as used herein generally represent software, firmware, hardware or a combination thereof. In the case of a software implementation, for instance, the module represents executable instructions that perform specified tasks when executed on a processor, such as the processor 206 of the mobile client device 202 in FIG. 2. The program code can be stored in one or more computer-readable media, an example of which is the memory 210 associated with the mobile client device 202 of FIG. 2.

Memory 210 is illustrated as storing various device applications 124 and user interfaces 126 that may be employed by the mobile client device 202 to provide various functionality. By way of example, the device applications 124 may include a browser to interact with content 120 from an Internet provider 116, a phone application to obtain phone service 118 from a cellular provider 114, and/or a navigation application. Other examples of device applications 124 include but are not limited to media applications, games, database, a productivity suite, an operating system, drivers, desktop applications, device specific applications, and so forth. Thus, device applications 124 represent a wide variety of functionality that may be operable on the example mobile client device 202.

The example server device 204 of FIG. 2, is depicted as having a resource manager 214 and a respective compression module 130 illustrated as modules that are executed via processor 208 and are also storable in the memory 212. The memory 212 of the example server device 204 is depicted as storing various resources 216 and other data 218. The resources 216 may be provided to clients over the networks 112 by way of webpages, mark-up language documents, documents having executable script, and/or other user interfaces. The resources 216 may include various types of content and/or services including webpages, images, documents, data, files audio/visual content, web services, service data, position data, maps, and so on. Resource manager 214 may be configured to manage access to the resources 216, performance of one or more services and/or servers to provide the resources 216, configuration of messages, data, and/or pages to provide the resources 216, and so forth. A variety of other data 218 may be stored in the memory 212 to facilitate provision of the service including, but not limited to, client authentication and account data, resource authorizations, client profiles and preferences, credentials, data and program files, and so forth.

In operation, the example mobile client device 202 may form HTTP requests 220 that are communicated over the networks 112 to the server device 204 to obtain requested resources 216. HTTP responses 222 may be formed by the server device 204 responsive to the HTTP requests 220. The HTTP responses 222 may be communicated over the networks 112 from the server device 204 to the client device 202. Compression modules 130 deployed to the mobile client device 202 and the server device 204 may be implemented to enable compression/decompression of HTTP requests 222 and HTTP responses 220 in accordance with HTTP header compression techniques described herein.

Having considered devices and components of an example environment, consider now example procedures for HTTP header compression that may be implemented in the environment using the example components, as well as in other environments.

Example Procedures

The following discussion describes techniques for HTTP header compression that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the environment 100 of FIG. 1 and the example devices of FIG. 2. The features of techniques described below are platform-independent, meaning that the techniques may be implemented on a variety of commercial computing platforms having a variety of processors.

Figure 3:
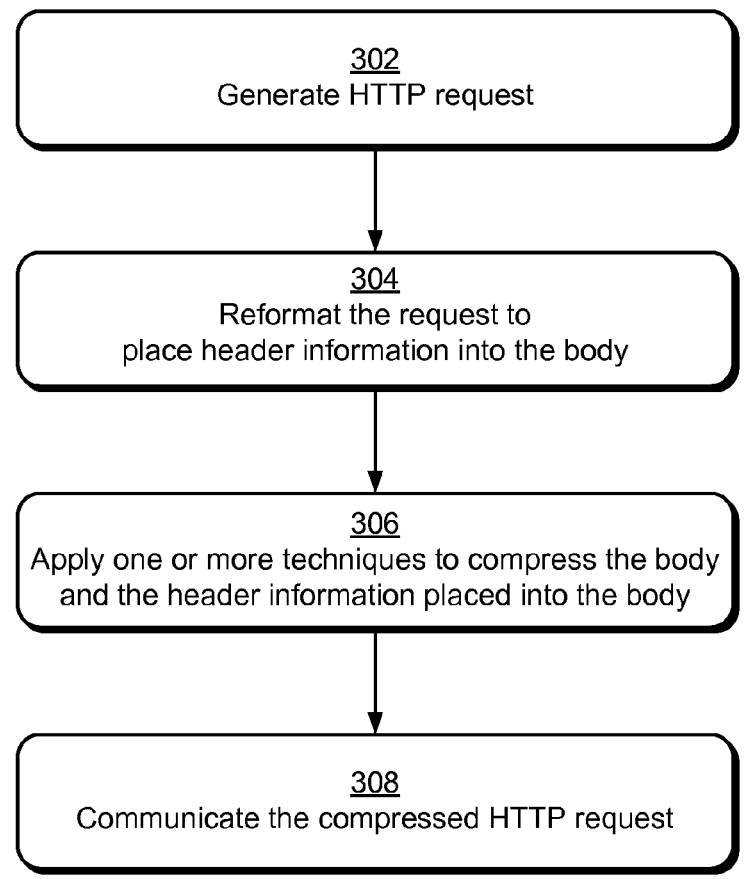
FIG. 3 is a flow diagram depicting an example procedure in which a device employs HTTP header compression techniques to form HTTP messages.

FIG. 3 depicts a procedure 300 in an example implementation in which a HTTP request is compressed. In at least some embodiments, procedure 300 may be performed by a suitably configured electronic device, such as mobile client device 202 of FIG. 2 having a compression module 130.

A HTTP request is generated (block 302). For example, a HTTP request for resources may be formed by the variety of device applications 124. Such requests may be communicated from the device applications 124 to the communication module 110 which processes the requests and communicates over the networks 112 with various providers and/or services to obtain requested resources 216. To reduce consumption of bandwidth and computing resources (e.g., processing power, memory, battery life, etc.), the communication module 110 may be configured to implement HTTP header compression techniques described herein. This may involve either or both of reformatting the HTTP request and/or applying compression algorithms to HTTP request. One way this may occur is by operation of a compression module 130 that is deployed to the mobile client device 202. The compression module 130 may be implemented in a variety of ways to perform HTTP header compression techniques. For example, the compression module 130 may be configured as an integrated component of the communication module 110 to process outgoing and incoming HTTP messages. Additionally, or alternatively compression module 130 may be configured as a standalone component of an electronic device 102 that is accessible to the communication module 130 and/or other device applications 124.

The HTTP request is reformatted to place header information into the body (block 304). In particular, the compression module 130 may operate to intercept or otherwise obtain HTTP messages from various device applications 124. The compression module 130 may perform various processing of an obtained message to reformat the message to include at least some information from the header in the body of message.

In general reformatting involves copying/moving selected information from the header into the body of a message. In at least some embodiments, reformatted information added to the body of a message may include one or more key value pairs from the header of HTTP message. The key value pairs represent parameters that are paired with values for the parameters. In one example, the key value pairs may be expressed in the form Header(n):Value(n) where n may be any integer from 1 to N. In this form, Header(n) represents the parameter name and Value(n) represents the corresponding value for the parameter. A particular header may contain any number of key value pairs from 1 to N. One or more of the key value pairs contained in the particular header may be added to the body when the message is reformatted. By way of example and not limitation, key value pairs may be employed to represent client identifiers, device identifiers, credentials and other authentication data, protocols, initialization values, and so forth. Information may be moved from the header to the body directly without substantial changes to the information. In other words an example key value pair Header(1): Value(1) may be added to the body as Header(1):Value(1).

Additionally or alternatively, reformatting can include using customized replacement values for at least some of the key value pairs or other information. This may create at least some reduction in the size of the HTTP message. For instance abbreviated and/or encoded values for parameter names and corresponding values in the header may be employed when adding header information to the body. In general, key value pairs in the form Header(n):Value(n) may be simplified to key value pairs in the form of H(n):V(n), where H(n) and V(n) represent abbreviated and/or encoded values for Header(n) and Value(n), respectively. In this way, custom replacement values may reduce the characters used to express key value pairs and accordingly the reformatting may involve some "custom" compression of a HTTP message. In addition, the use of custom replacement values in the reformatting operations facilitates backward compatibility with legacy devices that may be unable to recognize the abbreviated and/or encoded key value pairs if such values were used directly to generate the headers themselves.

Consider a particular example of a key value pair "DeviceID: PND1690" configured to identify a particular device. The key value pair "DeviceID: PND1690," as well as other key value pairs, may be included in a header of a HTTP request that is generated by a mobile client device 202. A compression module 130 may be executed to reformat the HTTP request by copying the key value pair "DeviceID: PND1690," to the body as well as other key value pairs from the header to the body. Optionally, the reformatting may use a customized replacement to simplify the key value pair to "DID: 1690" or another suitable simplification. Similar customized replacements may be used to abbreviate and/or encode other key value pairs.

One or more compression techniques are applied to compress the body and the header information placed into the body (block 306). In general, compression is applied to reduce the size of the HTTP message using various compression techniques. One way this may occur is by operation of a compression module 130 to apply compression algorithms to the body of the HTTP request. In at least some embodiments, the body to which compression is applied may be reformatted as just described to include at least some information from the header of HTTP request. A variety of conventional compression techniques, such as gzip, 7-Zip, compress, and/or other suitable compression algorithms, may be applied to the body including applying compression to header information that may be added to the body by reformatting. Accordingly, header information from a HTTP message may be compressed by reformatting the message to move the header information to the body and using conventional compression techniques that operate to compress the body. Advantageously, placing header information in the body of the message as described herein enables conventional compression techniques that are limited to body compression to be adapted for compression of the header information. Accordingly, HTTP header compression techniques may be implemented without extensive redesign of existing compression tools and programs. Of course, other customized and/or proprietary compression algorithms, tools, and programs are also contemplated.

As noted, reformatting may be selectively performed independently of and/or in conjunction with compression for a particular message. In other words, a mobile client device 202 may generate HTTP messages that are standard (e.g., neither reformatted nor compressed), reformatted, compressed, or both reformatted and compressed.

In at least some embodiments, compression module 130 may be configured to place identifiers or other suitable data in HTTP messages to convey information regarding how the message is formatted to a recipient. For instance, identifiers may be used to indicate whether a corresponding message is standard, reformatted, compressed, or both reformatted and compressed. The same or different identifiers may also be used to identify a particular compression algorithm used for compression and/or to identify a custom replacement scheme used for reformatting. In one example, identifiers may be inserted into the header of a message. Accordingly, a recipient of the message can make use of the identifiers to determine how to decompress and/or reconstruct the compressed message.

Identifiers that indicate how HTTP messages are formatted may be configured in a variety of ways. In one example, the identifiers may be configured as one or more key value pairs that are inserted into the header. This insertion can occur at various times including as part of reformatting, as part of compression, or following operations to reformat and/or compress a HTTP message. Different values for the key value pairs may be assigned to represent different kinds of formatting that may be associated with a message.

In one example, a parameter given the arbitrary label "r" herein may be assigned a value between 0 and 3 to indicate whether a corresponding message is standard, reformatted, compressed, or both reformatted and compressed. In this example, a value of 0 indicates a standard message, a value of 1 indicates reformatting, a value of 2 indicates compression, and a value of 3 indicates both reformatting and compression. Other values for "r" may also be defined to indicate other kinds of formatting. For instance, a value of 4 may be associated with a particular scheme used to make customized replacements for key value pairs when reformatting. A value of 5 may be used to indicate that gzip is employed for compression.

In another example a separate parameter given the arbitrary label "c" herein may be assigned a value to indicate a selected compression algorithm. For example, a value of "g" for the parameter "c" may be assigned to indicate that gzip is employed for compression. Thus, one or more identifiers, such as the example parameters "r" and "c" described, may be employed in various combinations to represent different kinds of formatting that may be associated with a message.

The compressed HTTP request is communicated (block 308) to cause various interaction between a sender and a recipient. For instance, a message that is reformatted and/or compressed using the techniques described herein can be communicated between devices. This can occur between a client and server, between clients in a peer-to-peer setting, between two servers, and so forth. The message may include identifiers configured to indicate how the sender has formatted the message. A recipient may be configured to process the compressed HTTP request based at least in part on the identifiers and to generate a response as discussed in greater detail in relation to the following figure. Further examples of HTTP messages that have been reformatted and/or compressed are described in relation to FIG. 5 below.

Figure 4:
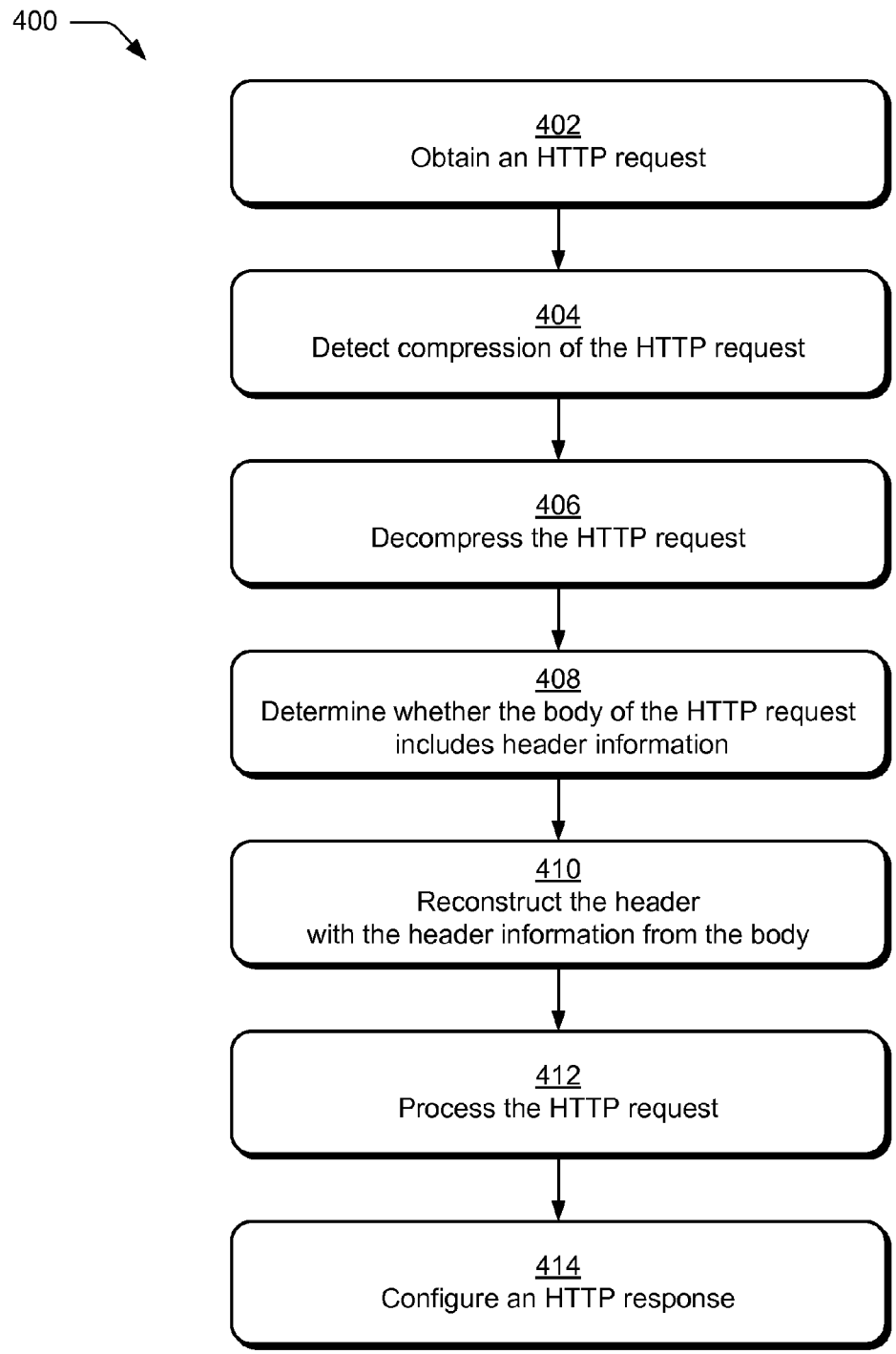
FIG. 4 is a flow diagram depicting an example procedure in which a HTTP message that employs HTTP header compression techniques is processed by a recipient.

FIG. 4 depicts a procedure 400 in an example implementation in which a compressed HTTP message is processed by a recipient. In at least some embodiments, procedure 400 may be performed by a suitably configured electronic device, such as server device 204 of FIG. 2 having a compression module 130.

A HTTP request is received (block 402). For example, a HTTP request configured in accordance with procedure 300 described in relation to FIG. 3 may be communicated to a server device 204. The server device 204 may include a compression module 130 configured to implement server aspects of HTTP header compression techniques described herein. In particular, the server device 204 may be configured to perform operations to decompress and reconstruct the received message. The HTTP request may be received by way of resource manager 214 configured to invoke a compression module 130 to decompress and/or reconstruct compressed HTTP messages received by the server device 204.

In particular, compression of the HTTP request is detected (block 404). One way this can occur is by examining a header of the received HTTP request to detect identifiers that indicates that the message has been compressed. As noted, identifiers may also be configured to indicate the type of compression algorithm that is employed. For instance, the received message may include a key value pair for a parameter "r" as discussed in relation to FIG. 3. Compression module 130 at the server device 204 may be executed to detect the value of "r", as well as other identifiers, and process the received HTTP message accordingly.

Responsive to detecting compression, the HTTP request is decompressed (block 406). For example, the compression module 130 may be executed to apply a decompression algorithm corresponding to a compression algorithm used for compression. Accordingly, if the value of "r" indicates that gzip is used for compression, a compatible decompression algorithm is used for decompression. In this way, identifiers included with a message may be used to determine what kind of compression is used for a particular message and perform corresponding operations to decompress the message.

In some cases a received message may already be an uncompressed message. As such, compression is not detected per block 404 and the decompression operation of block 406 may be omitted. In each case, the compression module 130 obtains an uncompressed message upon which further operations may be performed.

In particular, a determination is made regarding whether header information is included in the body of the requests. (block 408). This may also occur by examining the header to detect identifiers, such as the key value pair for the parameter "r" noted in the above example. In relation to reformatting of a HTTP message, identifiers placed into a HTTP message may indicate whether the message has been reformatted and/or identify a scheme used to perform reformatting. For instance, compression module 130 at the server device 130 may be executed to determine based on one or more identifiers included with a message whether or not the message has been reformatted to contain information for the header in the body of the message.

Responsive to determining that header information is included in the body, the header is reconstructed to include the header information from the body (block 410). The reconstruction may involve moving the header information placed in the body back into the header of the HTTP message. Reconstruction may also involve rewriting abbreviated or encoded header information in the body to undo customized replacements. For instance, abbreviated and/or encoded values in the form of H(n):V(n) may be restored to the unaltered form Header(n):Value(n). In the example described previously, the abbreviated key value pair "DID: 1690" may be rewritten as "DeviceID: PND1690" to undo the customized replacement made by the sender of the message. In particular, the compression module 130 at the server device 204 may be executed to identify a scheme used to perform customized replacements and perform reconstruction operations to undo the replacements. In some embodiments, a look-up table may be utilized for this purpose. Relationships may be built into certain types of data in the table to allow the compression module 130 to apply reformatting to specific data values (such as enumerated data values). The compression module 130 obtains the HTTP message in its original form without compression or reformatting and may perform processing to service the HTTP request.

On the other hand, if it is determined that the message is not reformatted, the reconstruction operation of block 410 may be omitted and the uncompressed message obtained following decompression may be further processed to service the HTTP request.

The HTTP request is processed (block 412) and a HTTP response is configured (block 414). For instance, the compression module 130 may provide the uncompressed message to a resource manager 214 configured to process the request and provide a response. The response may be configured to include or enable access to one or more resources 216 requested via the HTTP request. Compression module 130 may process a HTTP response formed by the resource manager 214 to implement HTTP header compression. For instance, the HTTP message may be reformatted and/or compressed in a manner comparable to reformatting and compression described in relation to example procedure 300 of FIG. 3. In some embodiments, a response may be formatted in accordance with schemes, techniques, and compression formats designated by the request. For example, compression module 130 of a server device 204 may be configured to format a response to match a request that initiated the response. In particular, compression module 130 may use the identifiers in a request to determine a designated format and generate the response in accordance with the designated format. Of course, servers and clients may also use different formats. For example, a client may send request that are reformatted only while a server may send responses that are both reformatted and compressed, and vice versa.

Having considered example procedures for HTTP header compression that may be implemented using the example devices and components, consider now example implementation details related to HTTP header compression in one or more embodiments.

Compression Implementation Examples

Figure 5:
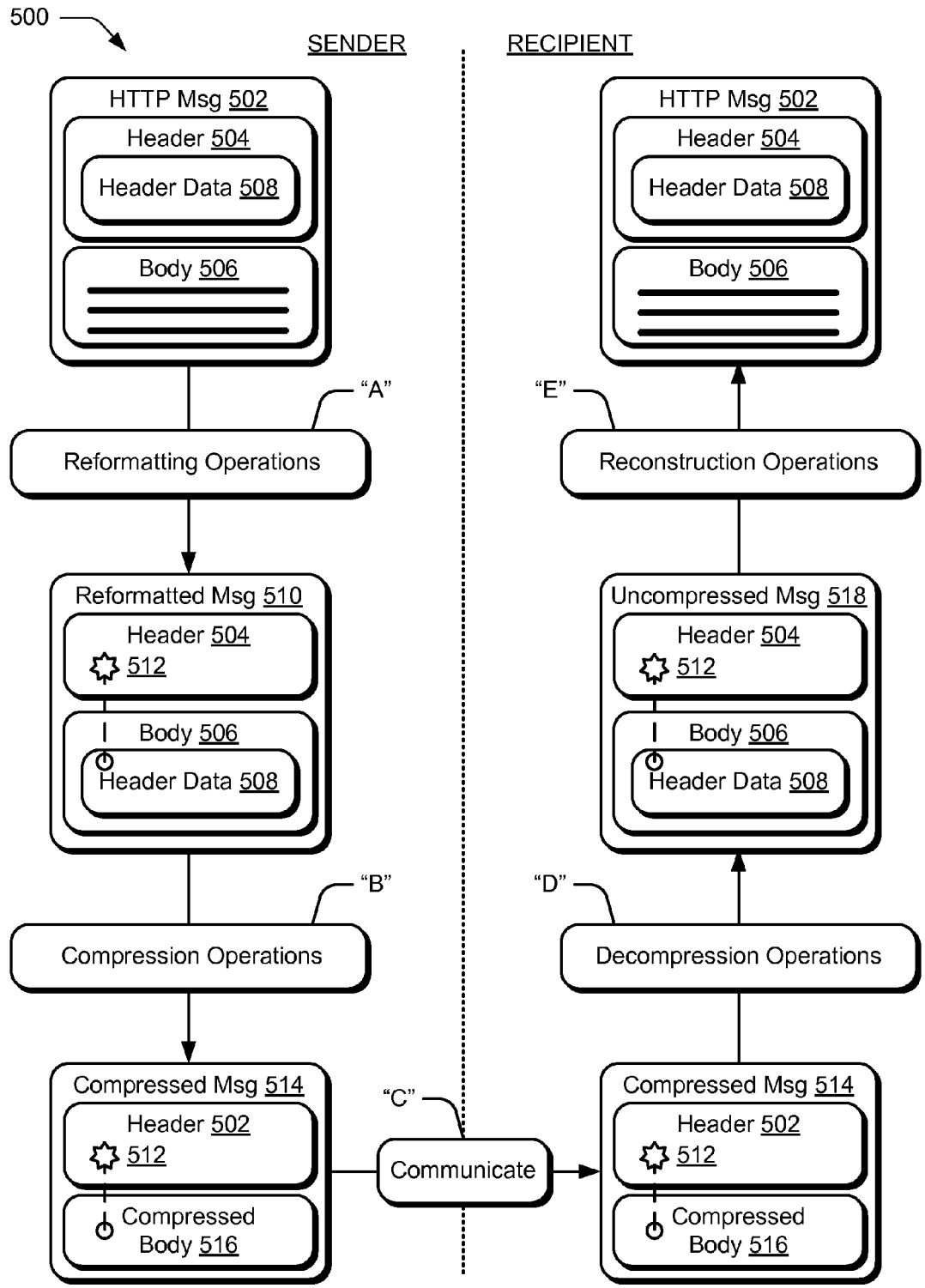
FIG. 5 is a diagram depicting example operations that may be involved in forming and processing HTTP messages that employ HTTP header compression techniques.

The following discussion describes example implementation details of HTTP header compression that may be employed in one or more embodiments. These implementation details are described in relation to an example compression of a message as illustrated in FIG. 5. A description of the example depicted in FIG. 5 appears just below and thereafter various implementation details are described with reference to the depicted example.

In particular, FIG. 5 illustrates an example implementation 500 showing example acts that may occur in the course of compressing/decompressing a HTTP message. The example acts may occur by operation of one or more compression modules 130 deployed to one or more devices. A HTTP message 502 is illustrated that includes a header 504 and a body 506. The header 504 is depicted as including header data 508. The HTTP message 502 may be formed by a sender (e.g., a mobile client device 202) to request and obtain resources from a recipient (e.g., server device 204).

Act A represents reformatting operations that may occur to place at least some of the header data 508 into the body 506. Reformatting may include customized replacements of key values, replacement of character strings and values, placing of header data in the body, and setting or placing identifiers in the header as discussed above. The result of the reformatting operation is a reformatted message 510.

The reformatted message 510 is illustrated as including an identifier 512 in place of the header data 508. The identifier 512 may be configured in various ways to identify that reformatting and/or compression of the HTTP message 502 has been performed. Different identifiers 512 may be placed in the header 504 to indicate different corresponding protocols, formats, reformatting schemes, compression algorithms, and so forth. It is contemplated that various identifier 512 may be placed in the header at various times including during reformatting, during compression, and following reformatting and compression.

Act B represents compression operations that may occur to reduce the size of the reformatted message 510. In particular, one or more conventional algorithms, such as gzip, may be applied to compress the body 506 and the header data 508 that is placed in the body 506. The result of the compression operations is a compressed message 514 having a compressed body 516.

The compressed message 514 can be communicated to a suitably configured recipient, such as a server device 204 to obtain resources 216 or otherwise interact with the recipient. Act C represents communication of the compressed message 514 between a sender and a recipient.

Act D represents decompression operations that may be performed by the recipient to enable further processing of the compressed message 514. The recipient may detect the identifier 512 in the compressed message 514. Based on values of one or more identifiers 512, the recipient may be able to determine if compression is employed and also identify techniques used for compression. The recipient may then apply corresponding decompression algorithms to decompress the compressed message 514. The result of the decompression operations is an uncompressed message 518. In at least some embodiments, the uncompressed message 518 may correspond to the reformatted message 510 generated by the sender.

Act E represents reconstruction operations that may be performed by the recipient to reconstruct the header 504 to include the header data 508. The result of reconstruction operations is the original HTTP message 502. The recipient may process HTTP message 502 obtained as a result of decompression operations and/or reconstructions operations to provide requested resources 216 or otherwise interact with a sender of the message.

Having considered various devices and techniques to enable HTTP header compression, consider now some example HTTP requests and responses formatted in accordance with the described techniques. The following examples are provided to illustrate implementation details of HTTP header compression that may be employed in one or more embodiments.

Example 1 is an example of a "standard" text request that has a number of key value pairs in the header. Example 2 is an example "standard" response corresponding to the example request in Example 1.

Example 1

Standard Text Request

```
POST /<resource> HTTP/1.1
Content-Length: <a>
Host: <serverName>.garmin.com
ReqHeader1: ReqHeader1Value
ReqHeader2: ReqHeader2Value
ReqHeader3: ReqHeader3Value
ReqHeader4: ReqHeader4Value
Key1=Key1Value     Key2=Key2Value
Key3=Key3Value     Key4=Key4Value     Key5=Key5Value
```

Example 2

Standard Text Response

```
HTTP/1.1 200 OK
Content-Length: <x>
Server: <serverIdentification>
RespHeader1: RespHeader1Value
RespHeader2: RespHeader2Value
RespHeader3: RespHeader3Value
Key1=Key1Value     Key2=Key2Value
Key3=Key3Value     Key4=Key4Value
```

Example 3 is an example of a reformatted text request and Example 4 is a corresponding reformatted text response. Note that customized replacements have been applied to abbreviate/encode the header fields and key value pairs that appear in Examples 1 and 2. For instance, "ReqHeader1: ReqHeader1Value" has been simplified to "h1=h1v" in the following examples. Note also that an identifier 512 in the form of a parameter "r" having a value 1 appears in the header in Examples 3 and 4. The value of 1 for "r" in these examples is configured to indicate that the customized replacements have been applied to abbreviate/encode the header values and key value pairs.

Example 3

Reformatted Text Request

```
POST /<resource> HTTP/1.1
Content-Length: <b>
Host: <serverName>.garmin.com
r: 1
h1=h1V     h2=h2V     h3=h3V     h4=h4V
k1=k1V     k2=k2V
k3=k3V     k4=k4V     k5=k5V
```

Example 4

Reformatted Text Response

```
HTTP/1.1 200 OK
Content-Length: <y>
r: 1
h1=h1V     h2=h2V     h3=h3V     k1=k1V
k2=k2V
k3=k3V     k4=k4V
```

Example 5 is an example of a reformatted and compressed text request and Example 6 is a corresponding reformatted and compressed text response. Again customized replacements have been applied to abbreviate/encode the header fields and key value pairs that appear in Examples 1 and 2. In addition, the body including the header information is compressed. The parameter "r" in these examples has a value of 3 to indicate that the messages have been both reformatted and compressed.

Example 5

Reformatted and Compressed Text Request

```
POST /<resource> HTTP/1.1
Content-Length: <c>
Host: <serverName>.garmin.com
r: 3
<compressedTextBody>
```

Example 6

Reformatted and Compressed Text Response

```
HTTP/1.1 200 OK
Content-Length: <z>
r: 3
<compressedTextBody>
```

The described technique may also be employed in conjunction with binary requests and responses. Since header key value pairs are text, the following binary examples show delimiters, such as <preDelimiter> and <postDelimiter>, that may, in some implementations, be required to allow the recipient of the message to separate header information from binary body data during Reconstruction Operations. Examples 7-12 below depict example binary requests and responses that are comparable to the text examples just described.

Example 7

Binary Standard Request

```
POST /<resource> HTTP/1.1
Content-Length: <a>
```

-continued

```
Host: <serverName>.garmin.com
ReqHeader1: ReqHeader1Value
ReqHeader2: ReqHeader2Value
ReqHeader3: ReqHeader3Value
ReqHeader4: ReqHeader4Value
<binaryRequestBody>
```

Example 8

Binary Standard Response

```
HTTP/1.1 200 OK
Content-Length: <x>
Server: <serverIdentification>
RespHeader1: RespHeader1Value
RespHeader2: RespHeader2Value
RespHeader3: RespHeader3Value
<binaryResponseBody>
```

Example 9

Binary Reformatted Request

```
POST /<resource> HTTP/1.1
Content-Length: <b>
Host: <serverName>.garmin.com
r: 1
<preDelimiter>h1=h1V     h2=h2V     h3=h3V
    h4=h4V<postDelimiter><binaryRequestBody>
```

Example 10

Binary Reformatted Response

```
HTTP/1.1 200 OK
Content-Length: <y>
r: 1
<preDelimiter>h1=h1V     h2=h2V
    h3=h3V<postDelimiter><binaryResponseBody>
```

Example 11

Binary Reformatted and Compressed Request

```
POST /<resource> HTTP/1.1
Content-Length: <c>
Host: <serverName>.garmin.com
r: 3
<compressedBinaryRequestBody>
```

Example 12

Binary Reformatted and Compressed Response

```
HTTP/1.1 200 OK
Content-Length: <z>
r: 3
<compressedBinaryResponseBody>
```

Having considered the preceding example HTTP requests and responses that may make use of HTTP header compression techniques, consider now a discussion of example devices suitable to implement aspects of the described techniques in one or more embodiments.

Example Device

Figure 6:
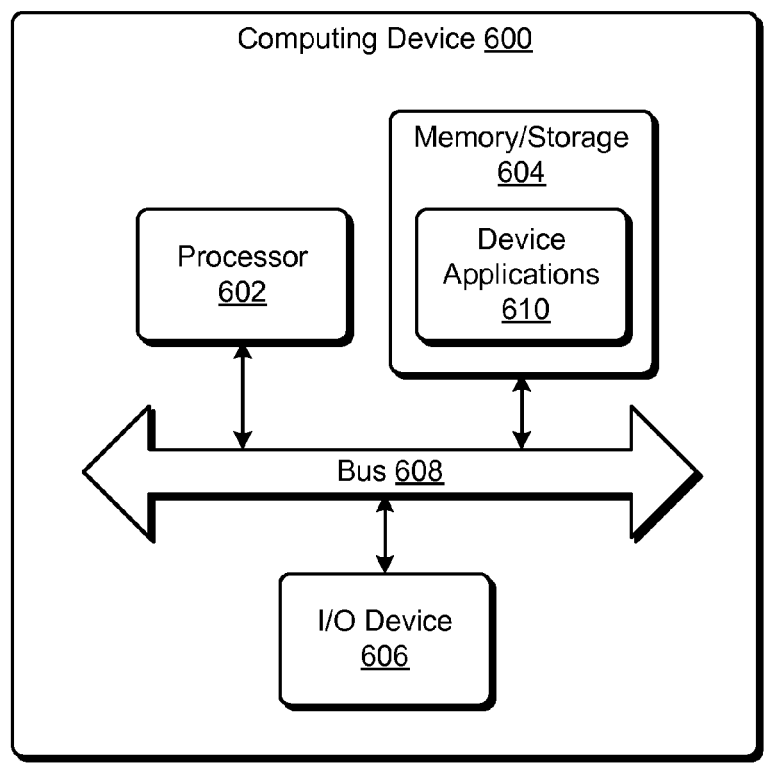
FIG. 6 is a diagram of an example device in accordance with one or more embodiments.

FIG. 6 illustrates an example computing device 600 that may implement the various embodiments described above. The computing device 600 may be, for example, an electronic device 102 of FIG. 1, a mobile client device 202 or a server device 204 of FIG. 2, or any other suitable computing device.

The computing device 600 includes one or more processors or processing units 602, one or more memory and/or storage components 604, one or more input/output (I/O) devices 606, and a bus 608 that allows the various components and devices to communicate one to another. The bus 608 represents one or more of several types of bus structures, including a memory bus or memory controller, a peripheral bus, an accelerated graphics port, and a processor or local bus using any of a variety of bus architectures. The bus 608 can include wired and/or wireless buses.

The memory/storage component 604 represents one or more computer storage media. The memory/storage component 604 may include volatile media (such as random access memory (RAM)) and/or nonvolatile media (such as read only memory (ROM), Flash memory, optical disks, magnetic disks, and so forth). The memory/storage component 604 may include fixed media (e.g., RAM, ROM, a fixed hard drive, etc.) as well as removable media (e.g., a Flash memory drive, a removable hard drive, an optical disk, and so forth). The memory/storage component 604 may include a variety of device applications 610 to provide various different functionality to the device.

The one or more input/output devices 606 allow a user to enter commands and information to computing device 600, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer-readable media. The computer-readable media may include a variety of available medium or media that may be accessed by a computing device. By way of example, and not limitation, computer-readable media may comprise "computer-readable storage media."

Software or program modules, including the communication module 110, positioning module 122, compression module 130, resource manager 214, and other device applications 610, may be embodied as one or more instructions stored on computer-readable storage media. The computing device 600 may be configured to implement particular functions corresponding to the software or program modules stored on computer-readable storage media. Such instructions may be executable by one or more articles of manufacture (for example, one or more computing device 600, and/or processors 602) to implement techniques for HTTP header compression, as well as other techniques. Such techniques include, but are not limited to, the example procedures described herein. Thus, computer-readable storage media may be configured to store instructions that, when executed by one or more devices described herein, cause various techniques for HTTP header compression.

The computer-readable storage media includes volatile and non-volatile, removable and non-removable media implemented in a method or technology suitable for storage of information such as computer readable instructions, data structures, program modules, or other data. The computer-readable storage media can include, but is not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or another tangible media or article of manufacture suitable to store the desired information and which may be accessed by a computer.

CONCLUSION

Various techniques for HTTP header compression have been described that may be implemented to facilitate compression of information within headers of HTTP messages. Although techniques for HTTP header compression have been described in language specific to structural features and/or methodological acts, it is to be understood that the appended claims are not necessarily limited to the specific features or acts described. Rather, the specific features and acts are disclosed as example forms of implementing the claimed devices and techniques for HTTP header compression.

What is claimed is:

1. A mobile client device, comprising:
   a processor;
   memory; and
   one or more modules stored in the memory and executable via the processor to:
     generate a hyper text transfer protocol (HTTP) request to obtain resources from a resource provider, the HTTP request having a header and a body;
     selectively reformat the HTTP request to place only a portion of information from the header in the body of the HTTP request, the selective reformatting occurring within a single communication layer; and
     apply compression to the HTTP request to compress the body including information from the header that is placed in the body;
   wherein the HTTP request is entirely reformatted in the mobile client device before it is communicated to the resource provider without adding any new header information except for an identifier indicating whether the HTTP request has been reformatted and/or compressed.

2. A mobile client device as recited in claim 1, further comprising a positioning module configured to enable the mobile client device to determine a geographic position using one or more position sources.

3. A mobile client device as recited in claim 1, wherein the compression is applied to the HTTP request using gzip techniques.

4. A mobile client device as recited in claim 1, wherein to selectively reformat the HTTP request comprises rewriting one or more key value pairs of the header in an abbreviated form.

5. A mobile client device as recited in claim 1, wherein the identifier is detectable by a recipient to determine that the HTTP request is reformatted and/or compressed.

6. A mobile client device as recited in claim 1, wherein the one or more modules are further executable to communicate the reformatted and compressed HTTP request over a network to the resource provider.

7. A mobile client device as recited in claim 6, wherein the one or more modules are further executable to:
   receive a HTTP response from the resource provider responsive to communication of the HTTP request;
   detect reformatting of the HTTP response to place header information into a body of the HTTP response; and
   responsive to detection of the reformatting, reconstruct the HTTP response to move the header information from the body of the HTTP response to a header of the HTTP response.

8. A mobile client device as recited in claim 7, wherein the one or more modules are further executable to:
   detect compression of the HTTP response; and
   responsive to detection of the compression, decompress the HTTP response to obtain a decompressed version of the HTTP response.

9. A method comprising:
   using one or more components of a computing device to perform operations including:
     generating a hyper text transfer protocol (HTTP) message for communication to a recipient, the HTTP message having a header and a body;
     reformatting the HTTP message to place one or more key value pairs from the header in the body of the HTTP message, the reformatting including rewriting the one or more key value pairs using custom replacement values to encode the key value pairs within a single communication layer; and
     communicating the reformatted HTTP message over a network to cause interaction with the recipient;
   wherein the HTTP request is entirely reformatted in the computing device before it is communicated to the recipient without adding any new header information except for an identifier indicating whether the HTTP request has been reformatted and/or compressed.

10. A method as recited in claim 9, further comprising applying compression to the HTTP message to compress the body of the HTTP message including the key value pairs placed into the body.

11. A method as recited in claim 9, wherein the identifier is detectable by the recipient to cause the recipient to perform one or more reconstruction operations to restore the key value pairs to the header.

12. A method as recited in claim 9, further comprising using the one or more components of the computing device to perform operations including:

receiving an incoming HTTP message;

detecting at least one of compression of the incoming HTTP message or inclusion of header information in a body of the incoming HTTP message;

when compression is detected, performing decompression operations to obtain a decompressed version of the incoming HTTP message; and when inclusion of header information is detected, performing reconstruction operations to restore the header information into a header of the incoming HTTP message.

13. A method as recited in claim 9, wherein the custom replacement values to encode the key value pairs comprise abbreviated versions of the key value pairs.

14. One or more non-transitory computer readable storage media comprising instructions stored thereon that, when executed by a computing device, cause the computing device to:

generate a hypertext transfer protocol (HTTP) message;

reformat the HTTP message to move one or more key value pairs from a header of the HTTP message into a body of the HTTP message, the reformatting occurring within a single data layer;

apply a compression algorithm to the HTTP message to compress the body including the key value pairs moved to the body of the HTTP message; and communicate the reformatted and compressed HTTP message over a network to a recipient;

wherein the HTTP request is entirely reformatted in the computing device before it is communicated to the recipient without adding any new header information except for one or more identifiers indicating whether the HTTP request has been reformatted and/or compressed.

15. One or more non-transitory computer readable storage media as recited in claim 14, wherein to reformat the HTTP message further comprises applying a custom replacement scheme to the key value pairs moved into the body of HTTP message to express the information using a reduced number of characters.

16. One or more non-transitory computer readable storage media as recited in claim 14, wherein the one or more identifiers are configured; and to convey information regarding formatting of the HTTP message to the recipient.

17. One or more non-transitory computer readable storage media as recited in claim 14, wherein the information regarding formatting of the HTTP message to the recipient comprises one or more of:

whether the HTTP message is reformatted to include key value pairs in the body;

whether the HTTP message is compressed;

a type of compression used to compress the HTTP message; or a custom replacement scheme used to express key value pairs moved to the body.

18. One or more non-transitory computer readable storage media as recited in claim 14, wherein the HTTP message comprises a request from the computing device to receive resources from the recipient.

19. One or more non-transitory computer readable storage media as recited in claim 14, wherein the HTTP message comprises a response from the computing device to a resource request communicated by a client device to the computing device.

20. One or more non-transitory computer readable storage media as recited in claim 14, wherein the instructions, when executed by the computing device, cause the computing device to:

receive an other HTTP message from a sender;

decompress the other HTTP message responsive to detecting compression of the other HTTP message;

reconstruct a header of the decompressed message responsive to determining that a body of the message includes key value pairs for the header; and process the decompressed and reconstructed HTTP message to generate a response for communication to the sender of the HTTP message.

21. A server device, comprising:

a processor;

memory; and one or more modules stored in the memory and executable via the processor to:

receive an HTTP request from a client device requesting one or more resources available from the server device;

examine one or more identifiers inserted into the HTTP request at the client device to determine whether the HTTP request is compressed or reformatted to contain header information for a header of the HTTP request in a body of the HTTP request;

decompress the HTTP request responsive to determining that the HTTP request is compressed;

reconstruct the header of the HTTP request to include the header information responsive to determining that the HTTP request is reformatted, the reconstruction occurring within a single communication layer; and process the HTTP request to generate a response to service the request from the client device for the one or more resources;

wherein the HTTP request is entirely reformatted in the computing device before it is communicated to the recipient without adding any new header information except for the one or more identifiers indicating whether the HTTP request has been reformatted and/or compressed, and wherein the HTTP request is entirely reconstructed in the server device.

22. A server device as recited in claim 21, wherein one identifier of the one or more identifiers is configured as a parameter having a value indicative of whether the HTTP request is a standard message, a reformatted message, a compressed message, or a reformatted and compressed message.

23. A server device as recited in claim 21, wherein the one or more modules are further executable to determine a response format designated by the one or more identifiers and configure the response to match the designated format.

24. A server device as recited in claim 21, wherein the one or more modules are further executable to:

reformat the generated response to add only a portion of header information of the response in a body of the response;

compress the body of the response including the at least some header information added to the body; and insert at least one identifier in the response detectable by the client device to determine that the response is reformatted and/or compressed.

* * * * *